(12) United States Patent  
Merchant

(10) Patent No.: US 9,043,512 B1  
(45) Date of Patent: *May 26, 2015

(54) METHOD FOR COMBINING NON-LATENCY-SENSITIVE AND LATENCY-SENSITIVE INPUT AND OUTPUT

(71) Applicant: Google Inc., Mountain View, CA (US)

(72) Inventor: Arif Merchant, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,733

(22) Filed: Jan. 7, 2015

Related U.S. Application Data

(63) Continuation of application No. 13/426,112, filed on Mar. 21, 2012, now Pat. No. 8,949,489.

(51) Int. Cl.
  *G06F 3/00* (2006.01)
  *G06F 13/16* (2006.01)
  *G06F 3/06* (2006.01)

(52) U.S. Cl.
  CPC .......... *G06F 13/1642* (2013.01); *G06F 3/0659* (2013.01); *G06F 13/1626* (2013.01)

(58) Field of Classification Search
  None
  See application file for complete search history.

(56) References Cited

U.S. PATENT DOCUMENTS

| | | | |
|---|---|---|---|
| 4,523,275 A | | 6/1985 | Swenson et al. |
| 6,049,798 A | * | 4/2000 | Bishop et al. ........................ 1/1 |
| 6,160,812 A | | 12/2000 | Bauman et al. |
| 6,480,927 B1 | | 11/2002 | Bauman |
| 6,654,852 B2 | | 11/2003 | Kanamaru et al. |
| 6,845,405 B1 | | 1/2005 | Thelin |
| 7,565,484 B2 | | 7/2009 | Ghosal et al. |
| 2006/0252429 A1 | | 11/2006 | Chen et al. |
| 2006/0259659 A1 | | 11/2006 | Castille et al. |
| 2009/0031314 A1 | | 1/2009 | Moscibroda et al. |
| 2009/0049256 A1 | | 2/2009 | Hughes et al. |
| 2010/0005470 A1 | | 1/2010 | Simon et al. |
| 2011/0072173 A1 | | 3/2011 | Holty et al. |
| 2011/0119407 A1 | | 5/2011 | Shah et al. |
| 2011/0238941 A1 | | 9/2011 | Xu et al. |
| 2013/0124805 A1 | | 5/2013 | Rafacz et al. |

OTHER PUBLICATIONS

EdrawSoft's article on "Standard Flowchart Symbols and Their Usage" copyright 2004-2014.
US Notice of Allowance in U.S. Appl. No. 13/426,112 Dtd Dec. 4, 2014.
US Notice of Allowance in U.S. Appl. No. 13/426,112 Dtd Sep. 18, 2014.
US Office Action in U.S. Appl. No. 13/426,112 Dtd Jun. 12, 2014.

* cited by examiner

*Primary Examiner* — Steven Snyder
(74) *Attorney, Agent, or Firm* — Edward A. Gordon; Foley & Lardner LLP

(57) ABSTRACT

Systems, mediums, and methods are provided for scheduling input/output requests to a storage system. The input output requests may be received, categorized based on their priority, and scheduled for retrieval from the storage system. Lower priority requests may be divided into smaller sub-requests, and the sub-requests may be scheduled for retrieval only when there are no pending higher priority requests, and/or when higher priority requests are not predicted to arrive for a certain period of time. By servicing the small sub-requests rather than the entire lower priority request, the retrieval of the lower priority request may be paused in the event that a high priority request arrives while the lower priority request is being serviced.

20 Claims, 8 Drawing Sheets

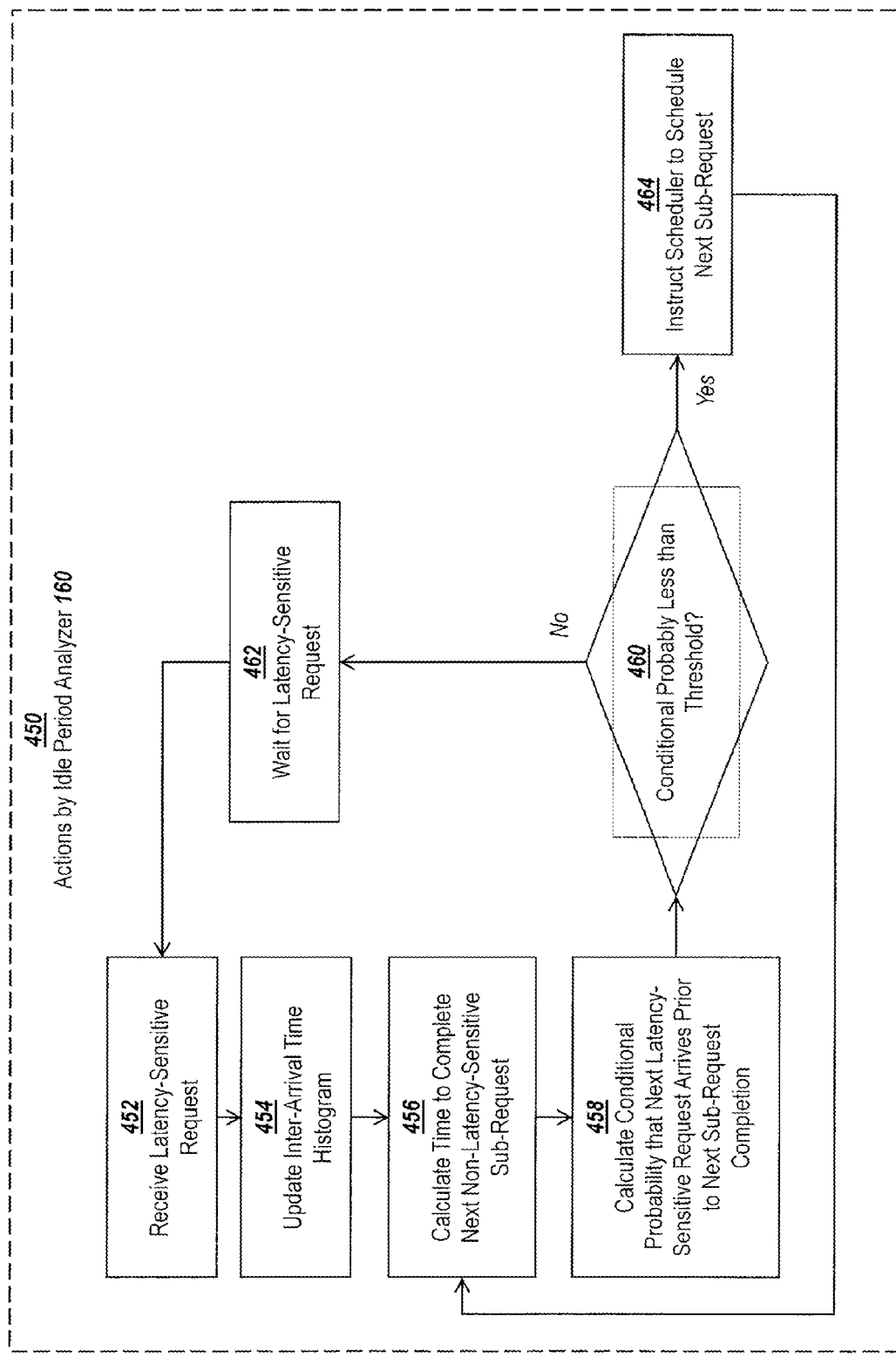

METHOD FOR COMBINING NON-LATENCY-SENSITIVE AND LATENCY-SENSITIVE INPUT AND OUTPUT

CROSS-REFERENCE TO RELATED PATENT APPLICATIONS

This application is a continuation of, and claims priority to, U.S. patent application Ser. No. 13/426,112, filed Mar. 21, 2012, the entirety of which is herein incorporated by reference.

BACKGROUND

Storage systems may store information that may be used by an entity, such as an application or a user. Examples of such storage systems include computer hard disk drives (HDDs), solid state drives (SSDs), flash memory, random access memory (RAM), read only memory (ROM), magnetic storage, and other types of non-transitory mediums capable of storing information.

The entity may send input/output requests, such as requests to read data from, or write data to, the storage system. The storage system may receive the request and act upon the request by (for example) reading the data associated with the request and returning the data to the requesting entity, or writing data to the storage system as requested by the entity.

However, not all of the requests have the same priority. For example, some entities may request high-priority data that the entity must access within a certain period of time (e.g., 10 milliseconds). Such entities can tolerate only a small amount of latency before the storage system returns the requested data. Other entities may be willing to tolerate a certain amount of waiting before the data is received. For example, an entity may submit a low-priority bulk request for a large amount of data which can be serviced in any (reasonable) amount of time.

Requests for data that should be completed within a certain (usually relatively short) period of time are called "latency-sensitive requests." Other requests for data which are not associated with a time limit (or which are associated with a relatively longer time limit) are called "non-latency-sensitive requests."

Latency-sensitive requests and non-latency-sensitive requests may be received by the storage system in any order, at any time. Problematically, in most storage systems a request for data cannot be preempted once the storage system begins to service the request and retrieve the data. Therefore, it can be difficult to schedule data requests. For example, if the storage system begins to service a non-latency-sensitive bulk request that takes 500 milliseconds to complete, and 10 milliseconds later receives a latency-sensitive request that must be completed in 15 milliseconds, it will not be possible to complete the latency-sensitive request in time.

SUMMARY

The present application addresses these and other issues by providing storage systems that are capable of servicing non-latency-sensitive requests when possible, while still allowing latency-sensitive requests to complete in a short period of time.

Described herein are systems, mediums, and methods for scheduling input/output requests to a storage system. The input/output requests may be received, categorized based on their priority, and scheduled for retrieval from the storage system. Lower priority requests may be divided into smaller sub-requests, and the sub-requests may be scheduled for retrieval only when there are no pending higher priority requests, and/or when higher priority requests are not predicted to arrive for a certain period of time. By servicing the small sub-requests rather than the entire lower priority request, the retrieval of the lower priority request may be paused in the event that a high priority request arrives while the lower priority request is being serviced.

For example, in some embodiments the input/output requests may be categorized into priority classes, such as high-priority latency-sensitive requests and lower-priority non-latency sensitive requests. In some embodiments, three or more priority classes may be used. The non-latency-sensitive requests may be divided into smaller sub-requests. For example, the sub-requests may be (in one non-limiting exemplary embodiment) 64 kilobytes or smaller in size.

An idle period analyzer may determine when an idle period of latency-sensitive requests is in effect. In one embodiment, the idle period analyzer may wait for a fixed period after a most recent latency-sensitive request, and determine that the idle period has begun if the fixed period elapses without receiving a further latency-sensitive input/output request. If, on the other hand, a further latency-sensitive request is received before the fixed period elapses, the idle period analyzer may determine that an idle period has not begun.

According to another embodiment, the idle period analyzer may maintain a histogram of recent inter-arrival times for latency-sensitive requests. Furthermore, the idle period analyzer may calculate or determine an estimated amount of time that will be required to complete a next non-latency-sensitive sub-request. Using the histogram and the estimated time for completion, the idle period analyzer may determine a conditional probability that the next latency-sensitive request will arrive prior to the completion of the next non-latency-sensitive sub-request. The idle period analyzer may instruct a scheduler to schedule the next non-latency-sensitive sub-request if the conditional probability is below a specified threshold. The idle period analyzer may further use the histogram to determine when an idle period is in effect.

A scheduler may schedule a latency-sensitive request for retrieval as soon as the latency-sensitive request is received. The sub-requests may be scheduled when the idle period analyzer determines that the idle period is in effect.

Furthermore, the scheduler may schedule at least two of the sub-requests sequentially while the idle period is in effect. In other words, the sub-requests may be scheduled so that a second sub-request is continuously scheduled while a first sub-request is being retrieved. For example, at least two sub-requests may be scheduled such that when a first sub-request completes, a second sub-request is prepared for retrieval. By maintaining at least two sub-requests in a continuously pending state, the lower priority request can be retrieved more efficiently due to the mechanics of the storage system.

If the scheduler schedules one or more of the sub-requests of a non-latency-sensitive request for retrieval, but a latency-sensitive request is received before the entire non-latency-sensitive request can be completely retrieved, then the latency-sensitive request may be queued preferentially over a further sub-request. In this way, the latency-sensitive request may be scheduled prior to the further sub-request of the non-latency-sensitive request.

In some embodiments, the storage system may include multiple storage devices. In such an environment, the idle period may be enforced independently for each device, or collectively for all devices. If two or more of the storage devices each maintain a copy of the data, the storage device having the largest estimated idle period among the storage devices may be selected to serve requested data, such as non-latency-sensitive data. Alternatively, a storage device may be selected to serve the requested data if the storage device is not currently serving a non-latency-sensitive input/output request.

In embodiments comprising a system for scheduling input/output requests (such as a server or other computing device), the system may include a memory for storing a non-latency-sensitive request queue and a latency-sensitive request queue. Latency-sensitive requests and non-latency-sensitive requests may be received at an input of the system via a network. The system may further include one or more storage devices for storing data that is the subject of the requests.

The system may provide an idle period analyzer for identifying when an idle period of latency-sensitive input/output requests is in effect, and a scheduler for scheduling the input/output requests for retrieval from the storage devices. Once retrieved, the requested data may be transmitted via a network back to a requesting entity using an output port of the system.

BRIEF DESCRIPTION OF THE DRAWINGS

FIG. 4B is a flowchart of an alternative embodiment of actions that may be performed by the idle period analyzer 160 according to exemplary embodiments described herein.

DETAILED DESCRIPTION

Described herein are systems, mediums, and methods for scheduling input/output requests to a storage system. The input output requests may be received, categorized based on their priority, and scheduled for retrieval from the storage system. Lower priority requests may be divided into smaller sub-requests, and the sub-requests may be scheduled for retrieval only when there are no pending higher priority requests, and/or when higher priority requests are not predicted to arrive for a certain period of time. By servicing the small sub-requests rather than the entire lower priority request, the retrieval of the lower priority request may be paused in the event that a high priority request arrives while the lower priority request is being serviced.

Furthermore, the sub-requests may be scheduled so that a second sub-request is continuously pending while a first sub-request is being retrieved. For example, at least two sub-requests may be scheduled such that when a first sub-request completes, a second sub-request is prepared for retrieval. By maintaining at least two sub-requests in a continuously pending state, the lower priority request can be retrieved more efficiently due to the mechanics of the storage system, as discussed in more detail below.

Figure 1:
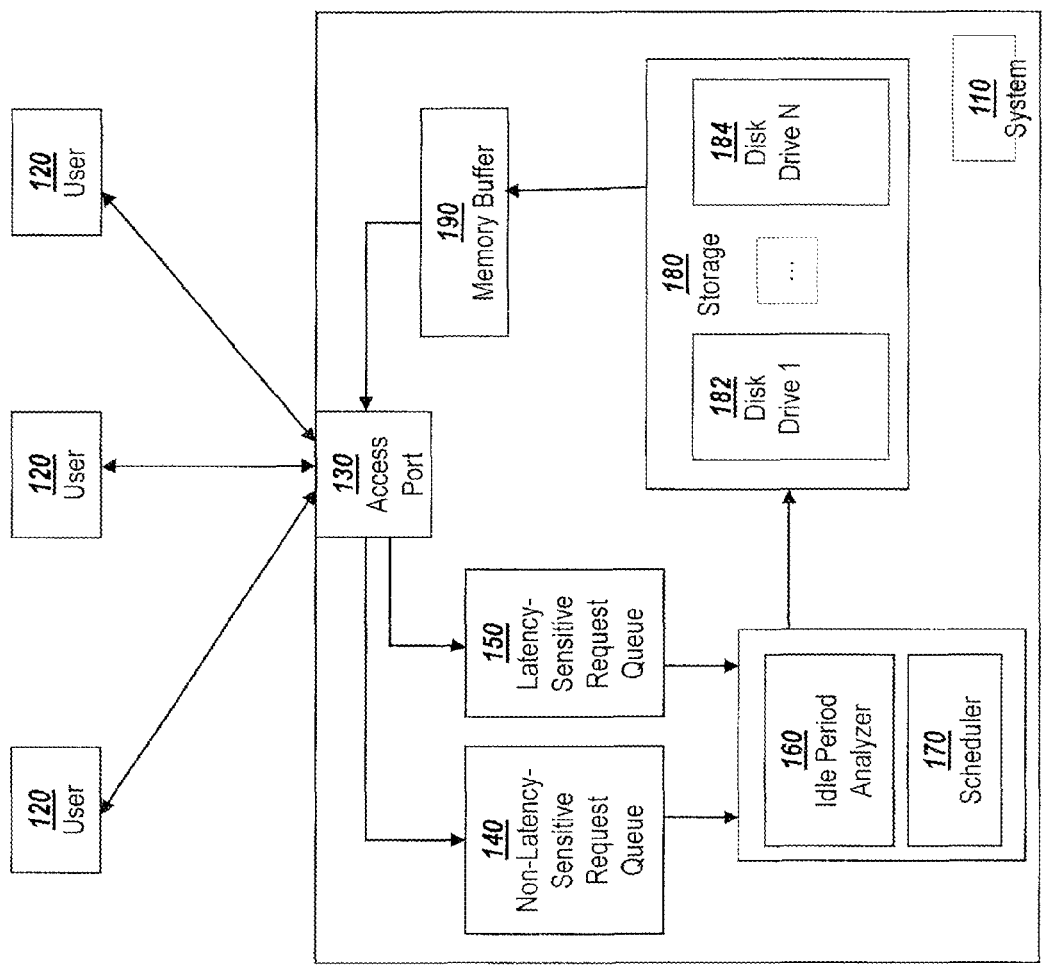
FIG. 1 depicts an exemplary system 110 for scheduling the retrieval of data associated with input/output requests including an access port 130, an idle period analyzer 160, and a scheduler 170.

FIG. 1 depicts an exemplary system 110 for scheduling the retrieval of data associated with input/output requests. The system 110 may be, for example, a computer such as a personal computer (PC), a data server or other network device, a mobile electronic device such as a cellular phone or tablet, or a custom electronic device that is capable of storing or retrieving data.

In some embodiments, the input/output requests may be sent by one or more entities 120. The entities 120 may be, for example, users, devices, or applications. The entities 120 may interact with the system 110 directly through a user interface and/or input means, or the entities 120 may interact with the system 110 indirectly, such as through computers connected to the system 110 through a network. The network may be, for example, a public network such as the Internet, or a private network.

The entities 120 may request that an action be performed with respect to some data on the system 110. Accordingly, the entity 120 may formulate input/output requests that may be received at an access port 130 of the system 110. The input/output requests may, for example, be requests to read and/or write data to or from the system 110. The requests may be sent in any appropriate format, such as the Small Computer System Interface (SCSI) format or the Serial Advanced Technology Attachment (SATA) format, among others.

The present application uses the terminology "servicing the request" to designate an action performed with respect to the request. For example, in the case of a read request, "servicing the request" may mean retrieving the data from the system 110 and returning the data to the entity 120. In the case of a write request, "servicing the request" may mean writing the data that is the subject of the request to the system 110.

The access port 130 may be any type of device capable of receiving the input/output requests, such as (but not limited to) a network port such as an Ethernet port, modem, a wireless network device, or a radio receiver/transmitter, or a data port such as a Universal Serial Bus (USB) port, a FireWire port, a serial port, or a parallel port.

The access port 130 may receive input/output requests, classify the requests into priority classes, and forward the requests to an appropriate priority class queue. These actions are described in more detail with respect to FIG. 3. For example, in some embodiments the priority classes may be latency-sensitive requests and non-latency-sensitive requests. Non-latency-sensitive requests may be forwarded form the access port 130 to a non-latency-sensitive request queue 140. Latency-sensitive requests may be forwarded from the access port 130 to a latency-sensitive request queue 150. The queues 140, 150 may be held in a memory, such as RAM or flash memory.

Requests from the non-latency-sensitive queue 140 should generally only be serviced when no latency-sensitive requests are pending or expected in the near future. Accordingly, an idle period analyzer 160 may review the input/output requests and determine when an idle period of latency-sensitive requests is in effect. For example, the idle period analyzer 160 may review the incoming latency-sensitive requests and determine when a gap in the latency-sensitive requests is likely to occur. The actions of the idle period analyzer 160 are discussed in more detail with respect to FIGS. 4A-4B.

A scheduler 170 may schedule latency-sensitive requests for servicing by a storage 180 as the latency-sensitive requests are received. If the idle period analyzer 160 determines that an idle period is in effect, the scheduler 170 may schedule non-latency sensitive requests for retrieval from the storage 180. Alternatively, the scheduler 170 may schedule non-latency-sensitive requests when specifically instructed to do so by the idle period analyzer 160.

In order to service the non-latency-sensitive requests while still allowing unexpected latency-sensitive requests to be quickly addressed, the scheduler 170 may divide the latency-sensitive requests into smaller sub-requests. The sub-requests may be serviced until a latency-sensitive request is received, at which point the latency-sensitive request may be preferentially scheduled prior to further subrequests. The actions of the scheduler 170 are discussed in more detail with respect to FIG. 5.

The data that is the subject of the input/output requests may be stored in a storage 180. The storage 180 may include a single data storage device, such as a hard disk drive (HDD), solid state drive (SSD), flash memory, random access memory (RAM), read only memory (ROM), magnetic storage, and other types of non-transitory mediums capable of storing information. Alternatively, the storage 180 may include multiple storage devices. For example, FIG. 1 depicts an embodiment in which the storage 180 includes N disk drives 182, . . . , 184.

As data is retrieved from the storage 180, the data may be buffered in a memory buffer 190. Small latency-sensitive requests may require minimal or no buffering. Non-latency-sensitive requests that are divided into smaller sub-requests may be buffered while the sub-requests are being retrieved. If a latency-sensitive request interrupts the retrieval of the sub-requests, the memory buffer 190 may be used to hold the already-retrieved sub-requests so that the retrieval of the non-latency-sensitive request can be effectively paused until the interrupting latency-sensitive request is completed. Then, the sub-requests can be resumed and further information can be placed into the memory buffer 190. When all the sub-requests have been serviced (or when the memory buffer 190 is full), the contents of the memory buffer 190 can be returned to the entities 120 through the access port 130. The results of latency-sensitive requests can also be returned to the entities 120 through the access port 130, with or without the use of the memory buffer 190.

It should be noted that the division of the system 110 into parts (such as the queues 140, 150, the idle period analyzer 160, the scheduler 170, and the buffer 190) may be a physical division or a logical division. For example, the scheduler 170, idle period analyzer 160, and access port 130 may be processes in a computer system, and the queues 140, 150 and the memory buffer 190 may be stored in the computer system's memory.

As noted above, when the non-latency-sensitive requests are divided into smaller sub-requests, the scheduler 170 may continuously maintain two or more of the sub-requests pending so that when a first sub-request completes, a second sub-requests is ready to be serviced. This allows the non-latency-sensitive request to be retrieved more efficiently, as discussed below.

Figure 2:
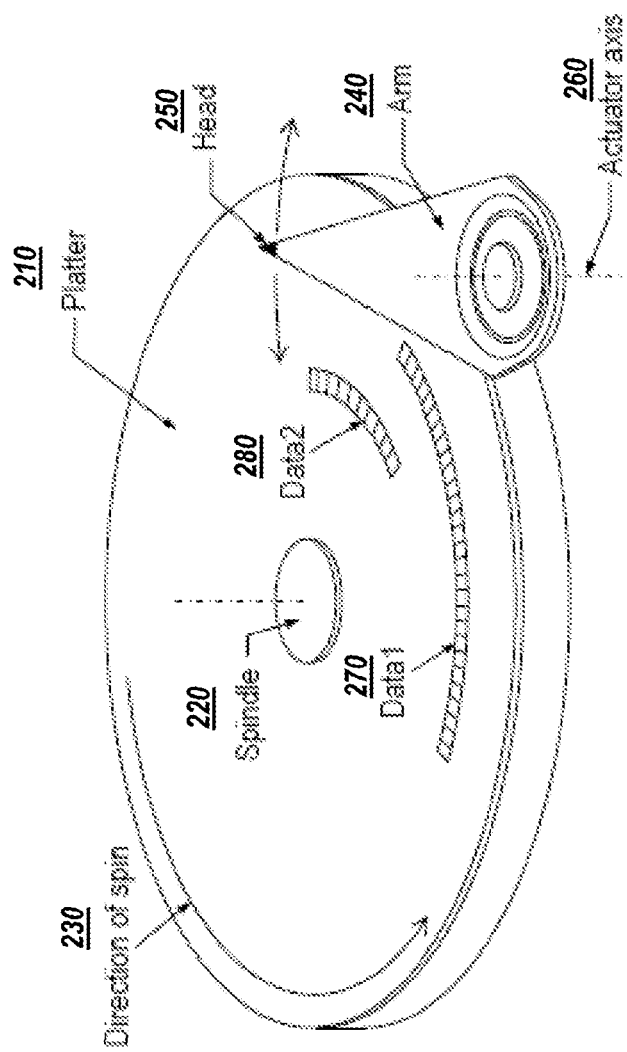
FIG. 2 depicts a portion of an exemplary data storage device suitable for use with the embodiments described herein.

As shown in FIG. 2, a storage device such as a hard disk drive may include one or more platters 210 onto which data may be written. For example, data may be written to the platter 210 by magnetically altering the surface of the platter 210. The platter 210 may be supported on a spindle 220, which rotates the platter 210 in a direction 230.

Data may be read from the platter 210 using an arm 240 with a magnetic head 250. The arm 240 may be moved across the platter 210 using an actuator that rotates on an actuator axis 260.

Data may be stored on the platter 210 sequentially. For example, FIG. 2 depicts two units of data 270, 280 stored on the platter 210. To read the data, the actuator rotates the arm 240 to position the magnetic head 250 over the appropriate region of the platter 210, and the magnetic head 250 reads the data 270 from the platter 210 as the data 270 rotates by the magnetic head 250.

Such a mechanic is particularly important when considering how to serve bulk requests, which are one type of non-latency-sensitive request. Data that is the subject of a bulk request is typically stored on a platter 210 sequentially (e.g., one unit of data immediately follows another). Therefore, if there is a pause between the data being read and a further unit of data being scheduled for reading, the platter 210 will have rotated by the magnetic head 250 while the further unit of data is being scheduled. The magnetic head 250 will then need to wait for the platter 210 to rotate fully back to its original position before the next unit of data can be read.

Accordingly, it is much more efficient to schedule data reads sequentially, so that all the data can be read in a single rotation of the platter 210, rather than waiting to schedule a data read until a subsequent data read is complete. If the latter approach is used, then every data read will require that the magnetic head 250 wait for a complete rotation of the platter 210, which dramatically reduces the efficiency of reading the data.

This mechanic has an impact on servicing the sub-requests discussed above with respect to FIG. 1. For example, once the latency-sensitive request is divided into sub-requests, one possibility is to schedule a sub-request, and then determine whether a latency-sensitive request has been dispatched. If a latency-sensitive request is pending, the latency-sensitive request could then be serviced. If no latency-sensitive request is pending, then a further sub-request could be scheduled.

Because the data making up a sub-request is likely to sequentially follow the data making up a previous sub-request on the platter 210, this technique would cause the magnetic head 250 to miss an opportunity to read the data associated with the subsequent request. Thus, the magnetic head 250 would need to wait for the platter 210 to rotate completely before servicing the subsequent sub-request.

Accordingly, in exemplary embodiments at least two sub-requests are continuously scheduled for retrieval. If a latency-sensitive request arrives while the first or second subrequest is being serviced (or is scheduled to be serviced), then the storage device may allow the first and/or second subrequest to complete and then schedule the latency-sensitive request for servicing after the completion of the first and/or second sub-request. In this situation, allowing the second subrequest to run to completion induces very little delay, because the magnetic head 250 is already in place (due to the servicing of the first subrequest, which is very likely to be located at a position on the platter 210 in close proximity to the second subrequest).

In some embodiments, if the storage device is capable of preempting the second request once the second request is scheduled, then the storage device may do so. For example, if a latency-sensitive request arrives while the first sub-request is being serviced, then the latency-sensitive request can preempt the second sub-request and assume priority over the second sub-request.

If no latency-sensitive request arrives before the first (and/or second) sub-request completes, then subsequent sub-requests may be scheduled in an iterative fashion and serviced without the need to wait for the platter 210 to execute a complete rotation.

In order for the requests to be retrieved from the platter 210 according to their proper priority (e.g., latency-sensitive requests take priority over non-latency-sensitive requests), the requests must be classified into priority groups. In exemplary embodiments, this classification may be performed by the access port 130, as shown in the flowchart 300 of FIG. 3.

Figure 3:
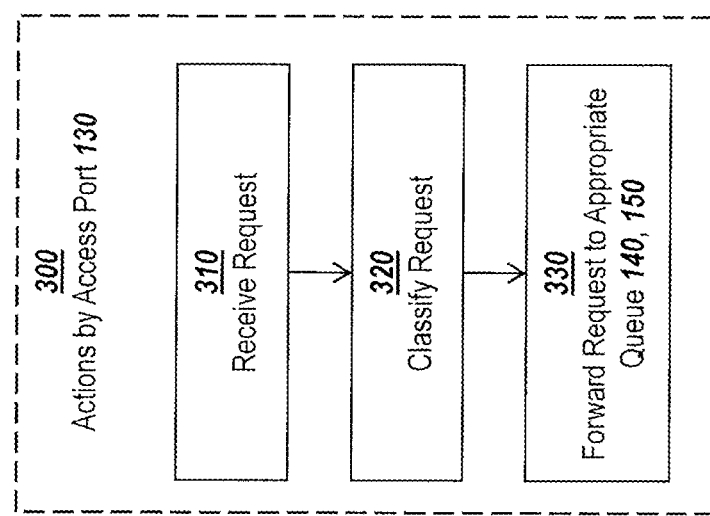
FIG. 3 is a flowchart of actions that may be performed by the access port 130 according to exemplary embodiments described herein.
Figure 4A:
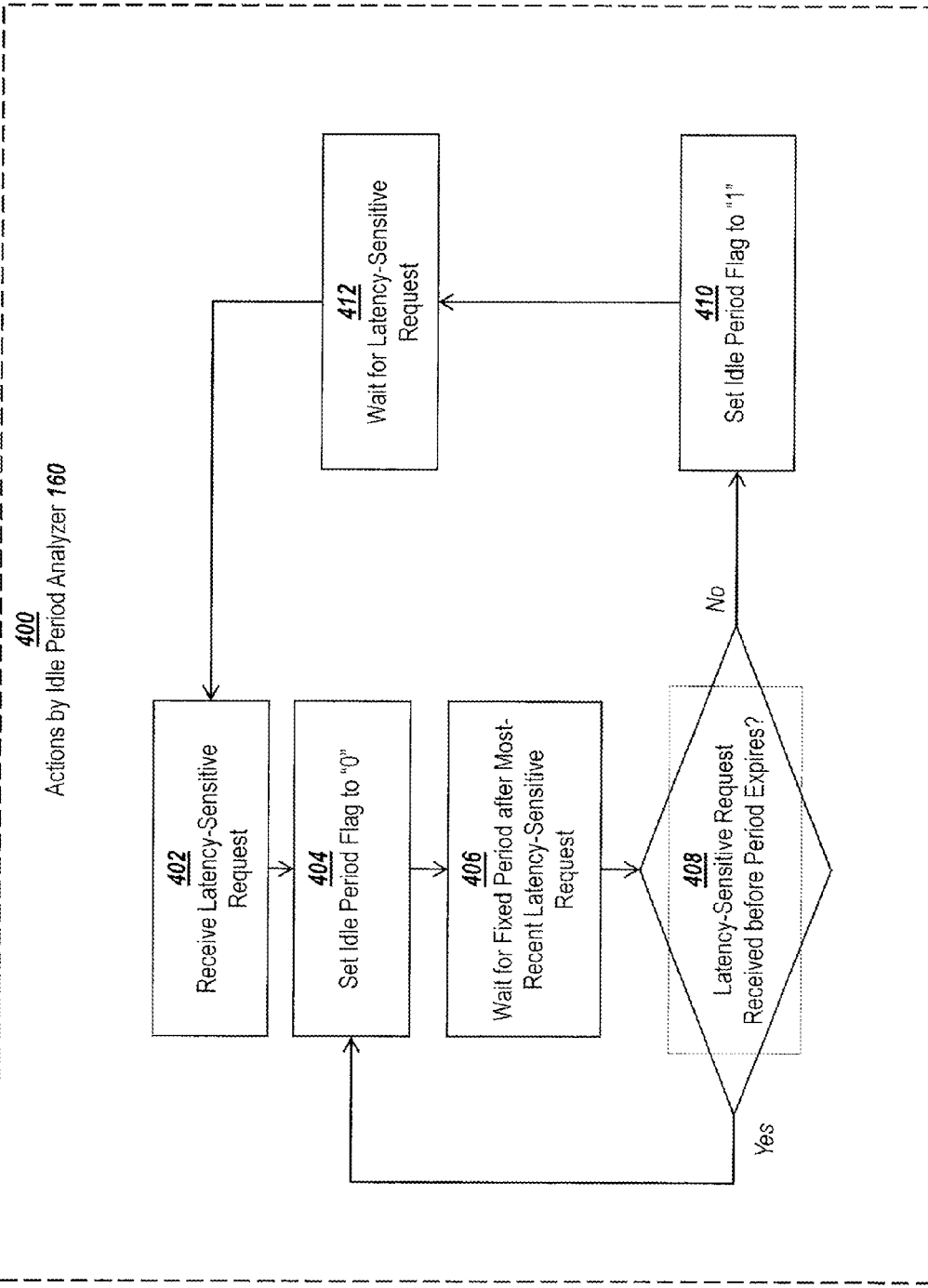
FIG. 4A is a flowchart of actions that may be performed by the idle period analyzer 160 according to exemplary embodiments described herein.
Figure 5:
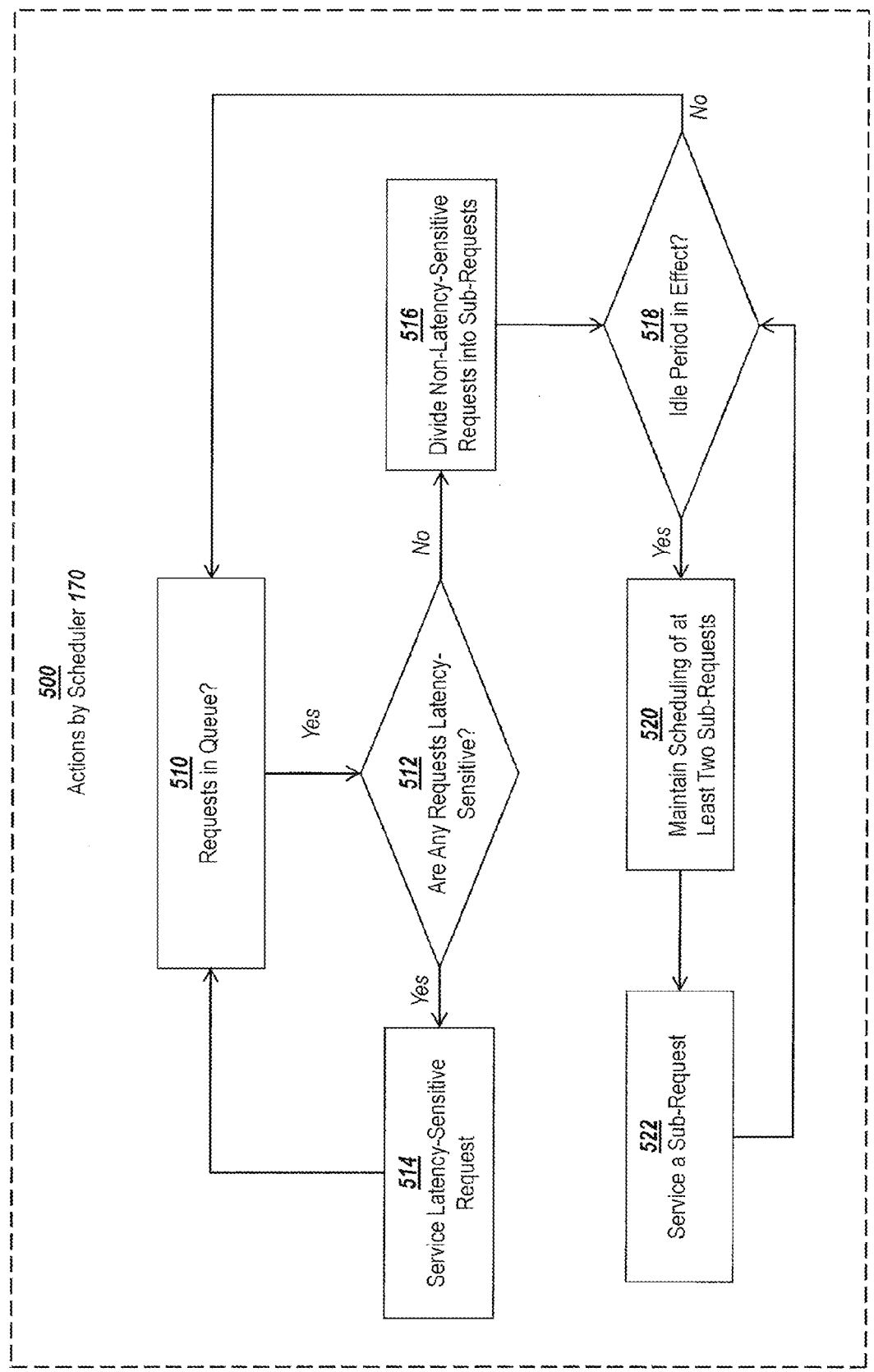
FIG. 5 is a flowchart of actions that may be performed by the scheduler 170 according to exemplary embodiments described herein.

It should be noted that, although FIGS. 3-5 describe actions performed by specific entities (e.g., the access port 130) and depicts those actions being performed in a specific order, the present invention is not so limited. Some actions may be taken out-of-order or omitted entirely. Some actions may be performed by entities other than those identified, or all the actions may be performed by a single entity. Some actions may be performed in parallel with other actions.

At step 310, the access port 130 may receive an input/output request. The input/output request may be received from a local user, or may be received over a network. The input/output request may take the form, for example, of a data packet identifying a particular unit (or units) of data to be retrieved. The data may be identified, for example, by a name or other identifier, or by a location of the data. The location of the data may be a logical location in a data storage (e.g., a file path), or may be a physical location (e.g., a physical address of the data on a hard drive).

At step 320, the input/output request may be classified into a priority group. The priority group may be, for example, a latency-sensitive priority group or a non-latency-sensitive priority group. Although exemplary embodiments described herein refer to two priority groups (latency-sensitive requests and non-latency-sensitive requests), the present invention is not so limited. Any number of priority groups may be employed and rules may be defined to determine which priority groups take precedence over other priority groups.

The input/output request may be classified using a number of schemes. For example, the request may identify itself as latency-sensitive or non-latency-sensitive, such as by employing a flag in a header of the request. Alternatively, the access port 130 may analyze the content request to determine whether the request is latency-sensitive or not. In another embodiment, the access port 130 may analyze meta information related to the request, such as an identity of a user making the request or the classification of other, similar requests (which may be received in a similar time frame, or have similar content requests) to determine whether the input/output request is latency-sensitive.

Once the input/output request is classified according to one of the priority groups, the access port 130 may forward the input/output request to the appropriate queue 140, 150. For example, if the access port 130 classifies an incoming request as non-latency-sensitive, the access port 130 may queue the request in the non-latency-sensitive queue 140. If the access port 130 classifies the incoming request as latency-sensitive, the access port 130 may queue the request in the latency-sensitive queue 150.

The queues 140, 150 may use any appropriate type of priority scheme, such as First-In-First-Out (FIFO) or highest-priority-first. Thus, the requests may also be ranked by priority within their respective priority classes (e.g., a particular latency-sensitive request may be deemed to be of a higher priority than another latency-sensitive request, and the higher-priority latency-sensitive request may be scheduled prior to the lower-priority latency-sensitive request, even if the lower-priority latency-sensitive request arrives at the access port 130 first).

While the input/output requests are being queued, the idle period analyzer 160 may be working to determine whether a gap in latency-sensitive requests is expected. Such a gap is referred to herein as an idle period. Non-latency-sensitive requests should typically only be serviced during an idle period, so that most latency-sensitive requests will find the system 110 prepared to service the latency-sensitive request immediately when the latency-sensitive request arrives.

A number of techniques can be employed to determine whether an idle period is in effect. One such technique is depicted in the flowchart 400 of FIG. 4A. The theory behind the embodiment of FIG. 4A is that latency-sensitive requests tend to arrive in groups, with gaps between during which no latency-sensitive requests arrive. Thus, in this embodiment the idle period analyzer 160 waits a specified period of time. If no latency-sensitive requests are received in that period of time, the idle period analyzer 160 determines that a gap has been entered and an idle period is in effect.

More specifically, at step 402 a latency-sensitive request is received at the access port 130 and enqueued into the latency-sensitive queue 150. The idle period analyzer 160 notes the existence of a latency-sensitive request, either by being informed by the access port 130, noting the arrival of an item in the latency-sensitive queue 150, or by being informed by the scheduler 170 when the scheduler 170 schedules the latency-sensitive request.

The idle period analyzer 160 may maintain a flag that indicates whether an idle period is in effect. The flag may be, for example, a boolean flag that is set to "0" when an idle period is not in effect, and set to "1" when an idle period is in effect. The flag may be initialized to "0" or "1" as is appropriate to the particular application. At step 404, after the arrival of the latency-sensitive request at step 402, the flag is set to "0."

At step 406, the idle period analyzer begins a countdown for a period of time after the receipt of the latency-sensitive request at step 402. The period of time may be predetermined and/or fixed, or may be adaptive so that the fixed period of time varies depending on the rate and/or distribution of latency-sensitive requests. For example, if a non-latency sensitive request has been queued without being serviced for a long period of time (e.g., greater than a predetermined threshold), the value of the fixed period of time may be lowered so that the bulk request may be processed sooner. Thus, the fixed period of time may vary depending on the age of the non-latency sensitive request.

If it is determined (step 408) that a latency-sensitive request arrives before the period of time elapses, then the idle period flag is maintained at "0" and the countdown is reinitialized. In contrast, if it is determined (step 408) that no latency-sensitive request is received before the period of time elapses, then the idle period analyzer 160 determines that an idle period is in effect. Hence, the idle period analyzer 160 sets the idle period flag to "1" (step 410), and awaits the arrival of the next latency-sensitive request (step 412).

The actions depicted in FIG. 4A are but one embodiment of an idle period analyzer. FIG. 4B is a flowchart 450 of an alternative embodiment of actions that may be performed by the idle period analyzer 160 to determine if an idle period is in effect. In the flowchart 450, the idle period analyzer 160 maintains a histogram of the inter-arrival periods of latency-sensitive requests. Using such a histogram and information about a pending non-latency-sensitive sub-request, the idle period analyzer 160 estimates the likelihood that the pending non-latency-sensitive sub-request can be completed before a latency-sensitive request arrives. If the idle period analyzer 160 deems that the sub-request can be completed in time, the idle period analyzer 160 instructs the scheduler 170 to schedule the sub-request.

At step 452, a latency-sensitive request is received. The idle period analyzer 160 may note the arrival of the latency-sensitive request and update (step 454) an inter-arrival time histogram including information on the arrival times of latency-sensitive requests.

At step 456, the idle period analyzer 160 may estimate the amount of time required to complete the next pending non-latency-sensitive sub-request. For example, the idle period analyzer may take into account the size of the sub-request and the average access time of the storage device to determine how long it will take for the storage device to service the sub-request.

In some embodiments, at step 456 the idle period analyzer 160 may estimate (and the scheduler 170 may subsequently schedule) the time required to complete two pending non-latency-sensitive sub-requests. Because the arm 240 of a hard disk typically needs to move into position to service the first sub-request (but is then already in position for the second sub-request), the time required to serve the second sub-request, if it is sequential with the first, is usually much smaller than the time to serve the first. Thus, the idle period analyzer 160 may take this phenomenon into account when estimating completion times for one or more subrequests.

At step 458, the idle period analyzer 160 may use the inter-arrival time histogram to calculate or determine a conditional probability that the next latency-sensitive request will arrive prior to the completion of the next pending non-latency-sensitive subrequest. For example, the idle period analyzer 160 may identify one or more patterns of latency-sensitive arrivals in the histogram to determine whether the current time period approximates any of these patterns. If so, the idle period analyzer 160 may use the pattern to extrapolate the likelihood that a latency-sensitive request will arrive in the near future. For example, the idle period analyzer 160 may determine, at step 458, that the probability of receiving a latency-sensitive request prior to the completion of the next pending sub-request is 10%.

At step 460, the conditional probability calculated at step 458 is compared to a threshold. The threshold may be predetermined, or may be determined or adjusted as input/output requests are serviced. For example, if the conditional probability is 10% as noted above, and the threshold is set at 20%, then the idle period analyzer 160 may determine, at step 460, to allow the next pending sub-request to be scheduled. If, on the other hand, the threshold were set at 5%, then the idle period analyzer 160 may not allow the scheduler 170 to schedule the next pending sub-request.

Accordingly, if the conclusion at step 460 is "no," then processing proceeds to step 462 and the system 110 may await the arrival of a further latency-sensitive request. Alternatively or in addition, at step 462 the system 110 may wait a fixed period of time. If, on the other hand, the conclusion at step 460 is "yes," then processing proceeds to step 464 and the idle period analyzer 160 may instruct the scheduler 170 to schedule the next pending non-latency-sensitive sub-request. Processing then returns to step 456 and the idle period analyzer 160 estimates whether a further sub-request may be serviced before the arrival of the next latency-sensitive request.

Using the method of FIG. 4B, there are two threshold parameters to define: the minimum idle period t after which the first sub-request is dispatched and the probability threshold for the subsequent sub-requests to be sent. These parameters can be determined by either manual or automated tuning. They should be set such that the bulk requests are served at an adequate rate and the latency-sensitive requests are not excessively delayed by bulk 10 requests.

The thresholds used to submit bulk sub-requests can depend upon the bulk request's characteristics. For example, if a sub-request has been pending for a sufficiently long time, then the threshold time t that the scheduler 170 waits after an idle period starts before scheduling a sub-request may be lowered. This would increase the probability that it is scheduled soon, but increase the probability that it will interfere with a latency-sensitive request.

As a further alternative based on FIG. 4B, the idle period analyzer 160 may maintain a histogram of inter-arrival times of the latency sensitive requests, but need not consider the existence of a pending non-latency-sensitive request. In such an embodiment, the idle period analyzer 160 determines, based on the histogram, whether a latency-sensitive request is expected to arrive within a certain period of time. If the idle period analyzer 160 determines that a latency-sensitive request is likely, the idle period analyzer 160 sets the idle flag to "0." If not, the idle period analyzer 160 sets the idle period flag to "1."

Once the idle period analyzer 160 determines whether an idle period is in effect, the scheduler 170 may use this information to schedule input/output requests. FIG. 5 is a flowchart 500 of actions that may be performed by the scheduler 170 to schedule the requests.

At step 510, the scheduler 170 determines whether there are any input/output requests in either of the queues 140, 150. If there are pending requests, the scheduler 170 determines, at step 512, whether any of the pending requests are latency-sensitive.

A latency-sensitive request may take priority over a non-latency-sensitive request at this stage. If any latency-sensitive requests exist in the latency-sensitive queue 150, then at step 514 the latency-sensitive request is serviced and the data associated with the latency-sensitive request is retrieved from the storage 180 and returned to the requesting entity.

If no latency-sensitive requests are pending at step 512, then the scheduler may divide a pending non-latency-sensitive request into smaller sub-requests at step 516. The sub-requests may be, for example, 64 kilobytes in size or smaller.

At step 518, the scheduler may determine whether an idle period is in effect, as defined by the idle period analyzer 160. If an idle period is not in effect (i.e., a latency-sensitive request is expected soon or is already pending), then the scheduler does not schedule a sub-request for retrieval and instead processing returns to step 510.

If an idle period is in effect at step 518, then the scheduler may determine that it is safe to schedule the non-latency-sensitive sub-requests for retrieval. At step 520, the scheduler 170 schedules at least two of the sub-requests for retrieval. At step 522, the scheduler 170 services the first of the at least two sub-requests to retrieve the data associated with the first sub-request. The retrieved data is placed in the memory buffer 190.

In some embodiments, the storage system may include multiple storage devices. In such an environment, the idle period may be enforced independently for each device, or collectively for all devices. If two or more of the storage devices each maintain a copy of the data, the storage device having the largest estimated idle period among the storage devices may be selected to serve requested data, such as non-latency-sensitive data. Alternatively, a storage device may be selected to serve the requested data if the storage device is not currently serving a non-latency-sensitive input/output request.

While the first sub-request is being serviced, the scheduler 170 reverts to step 518 to determine whether the idle period is still in effect. If the idle period is still in effect when the first sub-request is completed, then the scheduler 170 allows the next pending sub-request to be serviced. If the completion of the first sub-request means that there are now fewer than two pending sub-requests scheduled, the scheduler 170 also schedules a further sub-request to maintain at least two scheduled sub-requests.

If the scheduler 170 determines that the idle period is no longer in effect, the scheduler may allow the pending scheduled sub-request(s) to complete, and then schedule the latency-sensitive request before scheduling further sub-requests (while noting which sub-request is next, in order to resume the non-latency-sensitive request when possible) and reverts to step 510. Alternatively, if possible the scheduler 170 may preempt the next pending sub-request by canceling the next pending sub-request. Typically, the reason that the idle period would canceled while the first sub-request is serviced is the arrival of a latency-sensitive request. Hence, it is to be expected that the answers at steps 510 and 512 at this stage may both be "yes."

After all the sub-requests of a non-latency-sensitive request have completed, the scheduler 170 may determine whether the idle period remains in effect and, if so, may service the next non-latency-sensitive request by dividing the next non-latency-sensitive request into sub-requests and servicing the sub-requests. The "completion" of the non-latency-sensitive sub-requests may mean different things depending on the nature of the non-latency-sensitive request. For example, for bulk read sub-requests, the data retrieved may be accumulated in the memory buffer 190 until enough data to serve an entire bulk request is available; at this point the data may returned to the requesting entity, and the request completes. For write bulk requests, the bulk write request completes when the corresponding sub-requests have completed (for a write-through write caching policy) or as soon as the data is received at the buffer (for a write-back policy).

Figure 6:
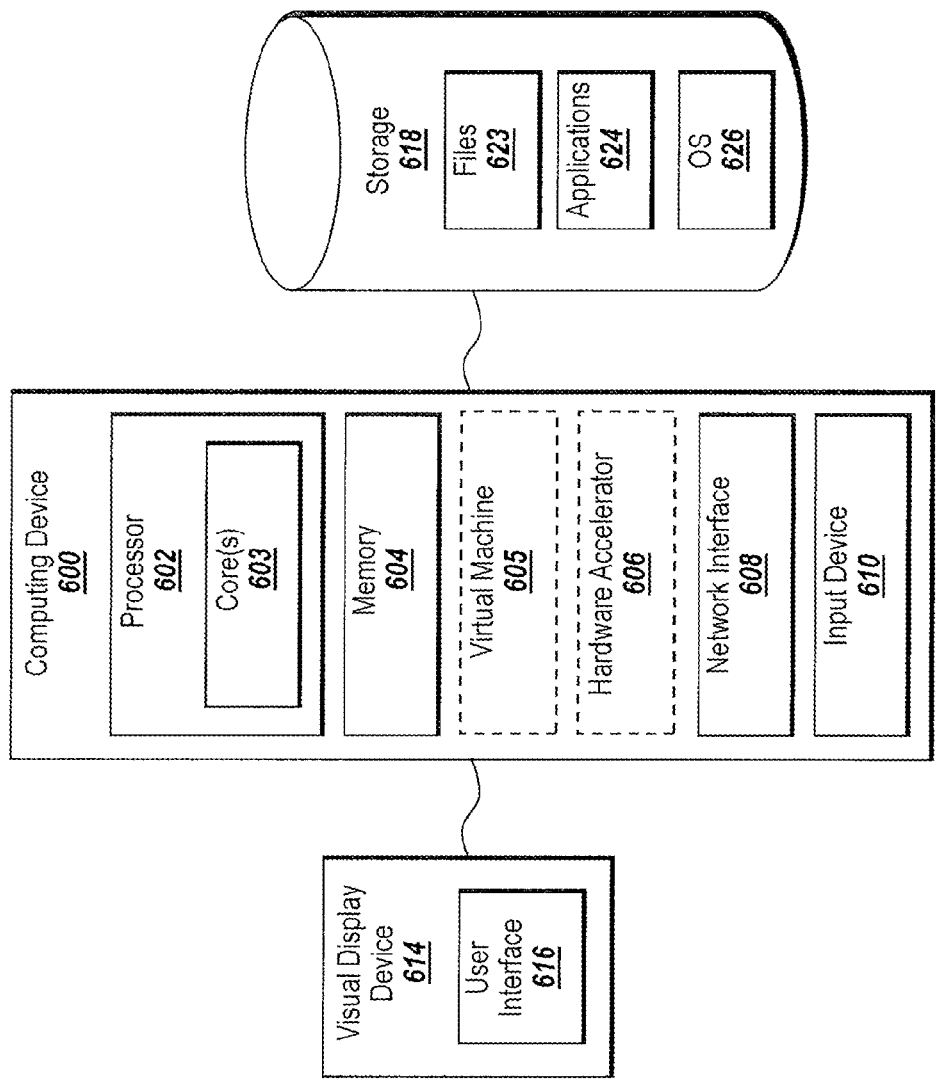
FIG. 6 depicts an exemplary computing device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 600 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments.

The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 7:
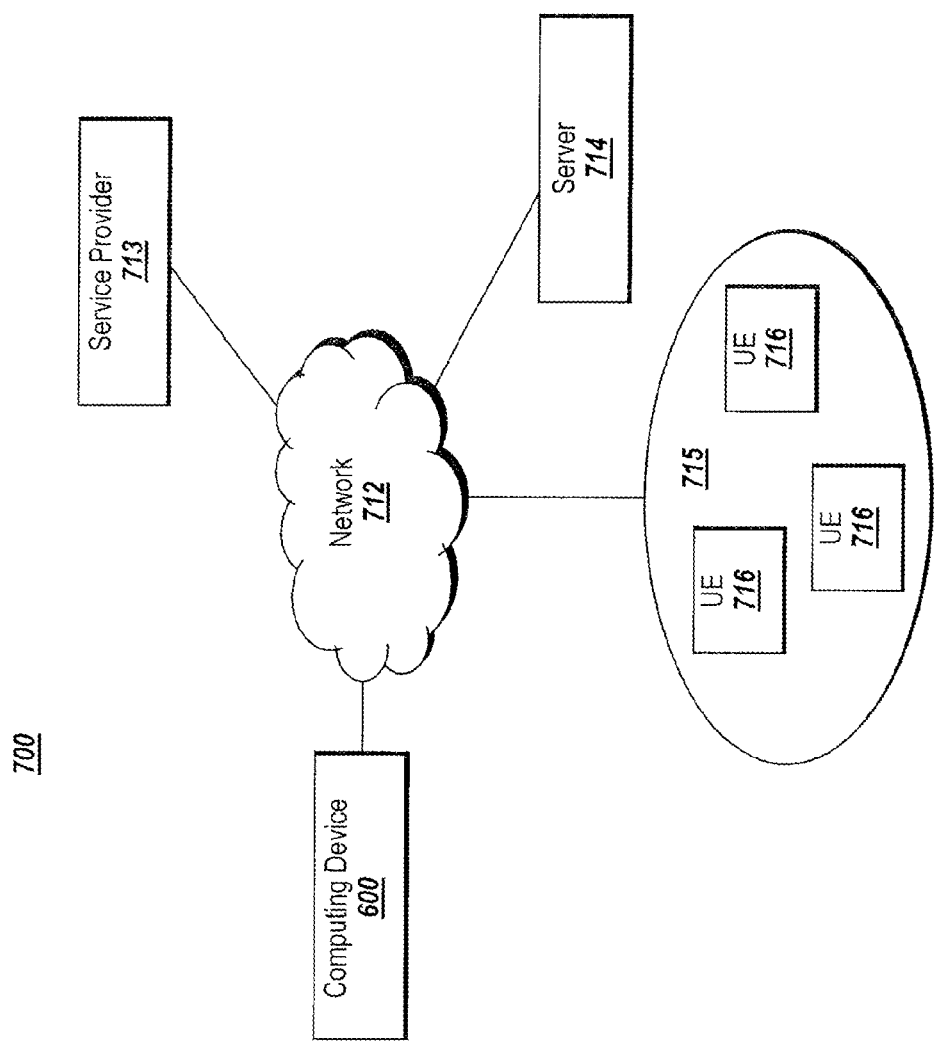
FIG. 7 is a network implementation suitable for use with exemplary embodiments described herein.

FIG. 7 depicts a network implementation that may implement one or more embodiments of the invention. A system 700 may include a computing device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/ or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 714 may include a device that receives information over the network 712. For example, the server 714 may be a device that receives user input from the computer 600.

The cluster 715 may include a number of units of execution (UEs) 716 and may perform processing on behalf of the computer 600 and/or another device, such as the service provider 713 or server 714. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 600 on a subscription basis (e.g., via a web service).

Units of Execution (UEs) may provide remote/distributed processing capabilities for the applications 624. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A computing system, comprising:
one or more request queues for holding input/output requests for data from a data storage comprising a plurality of storage devices, the input/output requests comprising:
non-latency-sensitive input/output requests, wherein the computing system divides the non-latency-sensitive input/output requests into a plurality of sub-requests; and
latency-sensitive input/output requests;
an idle period analyzer for identifying when an idle period of latency-sensitive input/output requests is in effect, wherein the idle period is enforced independently for each storage device in the plurality of storage devices; and
a scheduler for:
scheduling the sub-requests when the idle period analyzer determines that the idle period is in effect, wherein the scheduler schedules at least two of the sub-requests sequentially while the idle period is in effect, and
scheduling the latency-sensitive input/output requests when the latency-sensitive input/output requests are received;
wherein two or more of the storage devices each maintain a copy of requested data, and one of the storage devices is selected to serve the requested data when the one of the storage devices is not currently serving a non-latency-sensitive input/output request.

2. The system of claim 1, wherein the idle period analyzer:
waits for a set period of time after a most recent latency-sensitive request, determines that the idle period has begun if the fixed period elapses without receiving a further latency-sensitive input/output request, and determines that the idle period has not begun if a further latency-sensitive input/output request is received before the fixed period elapses.

3. The system of claim 2, wherein the set period of time is set dependent on an age of a pending non-latency-sensitive request.

4. The system of claim 1, wherein the idle period analyzer:
maintains a distribution of recent inter-arrival times for latency-sensitive input/output requests,
determines an estimated amount of time that will be required to complete a next non-latency-sensitive sub-request,
determines the conditional probability that a next latency-sensitive input/output request will arrive prior to the completion of the next non-latency-sensitive sub-request based on the distribution and the estimated amount of time.

5. The system of claim 1, wherein the latency-sensitive input/output requests form a first priority class of requests and the non-latency-sensitive input/output requests form a second priority class of requests, and further comprising a third priority of requests that is scheduled with respect to the first priority class and the second priority class.

6. The system of claim 1, wherein a first storage device having a largest estimated idle period among the two or more storage devices is selected to serve the requested data.

7. The system of claim 1, wherein a size of the sub-requests is 64 kilobytes or smaller.

8. An electronic device implemented method, comprising:
identifying a first request to access first data stored in a data storage comprising a plurality of storage devices, wherein two or more storage devices in the plurality of storage devices each maintain a copy of the first data, the first request being a non-latency-sensitive request;
dividing the first request into a plurality of sub-requests;
identifying that an idle period of latency-sensitive input/output requests is in effect for a selected storage device not currently serving a non-latency-sensitive input/output request, wherein the idle period is enforced independently for each storage device in the plurality of storage devices, the selected storage device maintaining a copy of the first data;
queuing the sub-requests for retrieval from the selected storage device, wherein the sub-requests are queued so that at least two sub-requests are scheduled for retrieval such that when a first sub-request completes, a second sub-request is prepared for retrieval;
identifying a second request to access second data in the data storage, the second request being a latency-sensitive request;
queuing the second request preferentially over a further sub-request of the first request so that the second request is scheduled prior to the further sub-request of the first request.

9. The method of claim 8, wherein the latency-sensitive input/output requests form a first priority class of requests and the non-latency-sensitive input/output requests form a second priority class of requests, and further comprising a third priority of requests that is scheduled with respect to the first priority class and the second priority class.

10. The method of claim 8, further comprising selecting the storage device to serve the requested data, the selected storage device having a largest estimated idle period among the two or more storage devices.

11. A non-transitory electronic device readable storage medium holding instructions that, when executed, cause one or more processors to:
identify a first request to access first data stored in a data storage comprising a plurality of storage devices, wherein two or more storage devices in the plurality of storage devices each maintain a copy of the first data;
identify that the first request is a non-latency-sensitive request;
divide the first request into a plurality of sub-requests;
identify that an idle period of latency-sensitive input/output requests is in effect for a selected storage device not currently serving a non-latency-sensitive input/output request, wherein the idle period is enforced independently for each storage device in the plurality of storage devices, the selected storage device maintaining a copy of the first data;
queue the sub-requests for retrieval from the selected storage device;
fetch data that is the subject of each sub-request continuously so that a second sub-requests is fetched immediately after a first sub-request;
identify a second request to access second data in the data storage;
identify that the second request is a latency-sensitive request;
queue the second request preferentially over a further sub-request of the first request.

12. The medium of claim 11, wherein the latency-sensitive input/output requests form a first priority class of requests and the non-latency-sensitive input/output requests form a second priority class of requests, and further comprising a third priority of requests that is scheduled with respect to the first priority class and the second priority class.

13. The medium of claim 11, wherein two or more of the storage devices each maintain a copy of requested data, and the one of the storage devices having a largest estimated idle period among the two or more storage devices is selected to serve the requested data.

14. The medium of claim 11, wherein a size of the sub-requests is 64 kilobytes or smaller.

15. A server for storing and manipulating data, the server comprising:
a non-latency-sensitive request queue for holding non-latency-sensitive input/output requests for data stored in a data storage comprising a plurality of storage devices, wherein the non-latency-sensitive input/output requests are divided into a plurality of sub-requests and received via a network;
a latency-sensitive request queue for holding latency-sensitive input/output requests for data stored in the data storage, wherein the latency-sensitive input/output requests are received via the network;
an idle period analyzer for identifying when an idle period of latency-sensitive input/output requests is in effect, wherein the idle period is enforced independently for each storage device; and
a scheduler for:
scheduling the sub-requests when the idle period analyzer determines that the idle period is in effect, wherein the scheduler schedules at least two of the sub-requests sequentially while the idle period is in effect, and
scheduling the latency-sensitive input/output requests when the latency-sensitive input/output requests are received; and an output port for transmitting a result of the non-latency-sensitive input/output requests and the latency-sensitive input/output requests over the network, wherein two or more of the storage devices each maintain a copy of requested data, and one of the storage devices is selected to serve the requested data when the one of the storage devices is not currently serving a non-latency-sensitive input/output request.

16. The server of claim 15, wherein the idle period analyzer:
   waits for a period of time after a most recent latency-sensitive request,
   determines that the idle period has begun if the fixed period elapses without receiving a further latency-sensitive input/output request, and
   determines that the idle period has not begun if a further latency-sensitive input/output request is received before the fixed period elapses.

17. The server of claim 15, wherein the idle period analyzer:
   maintains a distribution of recent inter-arrival times for latency-sensitive input/output requests,
   determines an estimated amount of time that will be required to complete a next non-latency-sensitive sub-request,
   determines a conditional probability that a next latency-sensitive input/output request will arrive prior to a completion of the next non-latency-sensitive sub-request based on the distribution and the estimated amount of time, and
   schedules the next non-latency-sensitive sub-request if the conditional probability is below a specified threshold.

18. The server of claim 15, wherein the latency-sensitive input/output requests form a first priority class of requests and the non-latency-sensitive input/output requests form a second priority class of requests, and further comprising a third priority of requests that is scheduled with respect to the first priority class and the second priority class.

19. The server of claim 15, wherein the one of the storage devices having a largest estimated idle period among the two or more storage devices is selected to serve the requested data.

20. The server of claim 15, wherein a size of the sub-requests is 64 kilobytes or smaller.

* * * * *